United States Patent [19]

Stampfer et al.

[11] 3,991,618

[45] Nov. 16, 1976

[54] SENSOR FOR AUTOMATIC STEERING SYSTEM FOR ROW-CROP HARVESTER

[75] Inventors: Michael Stampfer, Gottmadingen; Ewald Graeber, Weiterdingen; Helmut Oni, Gottmadingen; Ernst Rüede, Bietingen, all of Germany

[73] Assignee: Maschinenfabrik FAHR AG, Gottmadingen, Germany

[22] Filed: Nov. 5, 1975

[21] Appl. No.: 629,148

Related U.S. Application Data

[62] Division of Ser. No. 532,859, Dec. 16, 1974, Pat. No. 3,952,825.

[30] Foreign Application Priority Data

Dec. 18, 1973 Germany............................ 2362899
Jan. 3, 1974 Germany............................ 2400125

[52] U.S. Cl. .................... 73/432 R; 33/DIG. 13; 56/DIG. 15; 338/2; 340/61
[51] Int. Cl.² ..................................... A01D 35/14
[58] Field of Search................ 340/61; 33/DIG. 13, 33/125 R; 338/2, 6; 56/10.2, DIG. 15; 180/79.1; 73/432 R

[56] References Cited
UNITED STATES PATENTS

| | | | |
|---|---|---|---|
| 2,981,355 | 4/1961 | Rabuse .................. | 180/79.1 |
| 3,797,208 | 3/1974 | Strubbe................. | 56/10.2 |

Primary Examiner—James J. Gill
Attorney, Agent, or Firm—Karl F. Ross; Herbert Dubno

[57] ABSTRACT

A row-crop harvester adapted to travel along the ground in a transport direction is provided with four crop sensors. One crop sensor is provided to one side and in front of the harvester and normally feels the edge of the crop in front of the harvester and generates an output that controls an automatic steering system which guides the harvester along this edge. Another sensor is provided at the back of the harvester on the other side from the front sensor and serves to feel the edge of the swath just cut. Another sensor in front of the cutter on the harvester detects a gap in the crop and serves to switch the automatic steering system over from the front sensor to the back sensor in case a gap appears in the crop so that the harvester will not swing back and forth to follow minor crop gaps. In addition another sensor is provided on the front of the harvester so that when it arrives at the end of the field the harvester is automatically stopped and can only be moved by manual takeover of the steering. The sensors can be formed as horizontally extending curved rods which are deflected by the crop and which are provided adjacent their supported front end with strain gauges which are connected into the electronic control system for the harvester.

4 Claims, 5 Drawing Figures

FIG. I

SENSOR FOR AUTOMATIC STEERING SYSTEM FOR ROW-CROP HARVESTER

This is a division of application Ser. No. 532,859 filed Dec. 16, 1974, now U.S. Pat. No. 3,952,825.

CROSS-REFERENCE TO RELATED APPLICATION

This application is related to the commonly assigned application Ser. No. 496,743 filed on 12 Aug. 1974, now U.S. Pat. No. 3,946,825 and in turn related to commonly assigned patent application Ser. No. 421,494 filed on 3 Dec. 1973, now U.S. Pat. No. 3,908,345.

FIELD OF THE INVENTION

The present invention relates to an automatic steering system for a standing-crop harvester and to a crop sensor therefor. More particularly this invention concerns such a steering system which automatically guides a harvester along the edge of the previously cut swath in a standing crop.

BACKGROUND OF THE INVENTION

There is disclosed in the above cited copending patent application Ser. No. 496,743 a standing crop harvester which has a chassis adapted to be displaced along the ground in the transport direction and carrying a pair of guide wheels which are normally controlled from the steering wheel. A sensor carried on an arm in front of the machine detects the edge of the swath in a standing crop and generates an output which varies the impedance of one element of a bridge circuit. Another element of this bridge circuit has its impedance varied in accordance with the inclination of the harvester on the ground, another element is varied in accordance with the speed of the harvester on the ground, and a fourth element is varied in accordance with the position of the wheels of the harvester relative to the direction of travel. A zero-voltage detector connected across this bridge operates an electromechanical valve which steers the vehicle automatically, compensating for inclination of the ground under the harvester and speed of the harvester along the ground, and using the feedback signal from the wheel position so as accurately to guide the harvester along the edge of the swath. The steering wheel is provided with an electrical capacitive sensor which shuts off the automatic steering system immediately when the operator touches the wheel so that he can readily take over the manual operation of the harvester. In addition a double check valve is provided between the power steering system and the hydraulic cylinder serving to guide the wheel of the vehicle so as to prevent rotation of the steering wheel when the automatic pilot is in operation.

The above-cited copending application Ser. No. 421,494 describes an agricultural machine having a pivotally mounted implement support which is vertically positioned by a valve-operated hydraulic piston-and-cylinder arrangement. A single control lever is operable from the central hold position between two nonlocking and nonindexed raise and lower positions to operate this piston-and-cylinder arrangement as well as to locking and indexed follow and set position. In the set position the switches carried by a set-point indicator are connected to the hydraulic-cylinder valve, and to an actual value indicator pivoted next to the set-point indicator on the frame of the machine and linked to the support serves to operate these switches to maintain the support in a predetermined position relative to the machine frame. In the follow position the support can be positioned in a mode whereupon the pressure in its ram is kept within a certain range so that this support rides lightly on the ground or limit switches operated by a ground can be connected through the control to the hydraulic-cylinder valve to maintain the support at a predetermined spacing above the ground.

It is a difficulty with automatic steering systems that when a gap in the standing crop is encountered the apparatus tends to hunt around to follow the contours of the gap. This is disadvantageous in that it is a frequent occurrence, especially with a row crop such as corn or soy beans, that several plants will be missing in a row. The principal disadvantage of this hunting in order to follow the contours of the gap in the crop is that the irregular swath cut during the hunting is then followed in each successive swath so that the harvesting operation, which normally follows a regular or straight path along the rows of the crop, becomes irregular.

Such automatic steering systems usually employ a crop sensor in the form of complicated lever-potientometer arrangements that feel the standing crop and generate an output proportional to the proximity of a row of the crop to the detector. These devices are relatively expensive and tend to foul so that they must frequently be serviced in order to function properly.

OBJECTS OF THE INVENTION

It is therefore an object of the present invention to advance the principles of the above-mentioned application.

Yet another object is the provision of an improved automatic steering system for a harvester having a chassis adapted to travel in the transport direction along the ground in a direction determined by guide wheels and carrying a cutter for forming a swath in the crop.

Yet another object is the provision of such a system wherein the harvester is not deflected immediately when a gap in a row of standing crop appears.

Yet another object is the provision of an improved sensor arrangement for such a steering system.

SUMMARY OF THE INVENTION

These objects are attained in part according to the present invention in such a steering system which comprises a front sensor on the chassis to one side of the head of the cutter in transport direction for detecting the edge of uncut standing crop and generating an output corresponding to the position of this edge relative to the chassis. A back sensor is provided on the chassis to the other side of and generally behind the cutter in the transport direction for detecting the edge of a swath made by the cutter and for generating an output corresponding to the position of the swath edge relative to the chassis. Steering means is provided on the chassis which is operable by either or both of these outputs and connected to the guide wheels for guiding the chassis along the edge of the uncut crop. Means is also provided including a detector on the chassis ahead of the cutter between the two sensors and connected between the front sensor and the steering means for disconnecting the front sensor from the steering means on detection of a gap in the crop ahead of the cutters and between the sensors. With such a system if a gap appears in the crop it is detected and the apparatus continues to steer itself using the back sensor so that the harvester will not hunt back and forth trying to find the true swath edge, but will continue on its path with the normal front sensor being cut out as it passes the gap but immediately being cut back in as soon as the gap is behind the gap detector. Such a system is extremely efficient when used in a harvester cutting row crops and generally following along the rows, as the back sensor will serve accurately to guide the harvester along the adjacent uncut row.

In accordance with yet another feature of this invention each sensor comprises an arcuate rod which is mounted on a rigid support provided on the chassis and which extends horizontally back toward the chassis. The rod is flexible and is provided adjacent its end connected to the support with at least one strain gauge that produces an output corresponding to the amount of deflection or bending of the rod, and therefore to the proximity of the crop deflecting the rod. These strain gauges are bonded directly to the rod and therefore form a system which is almost foulproof, as it has no articulated and moving parts that can become fouled and inoperative.

According to yet another feature of the present invention two detectors are provided ahead of the cutter and the mower to either side of the machine, but between the front and back sensors. The detector on the side of the machine near the front sensor is connected to the above-described cutout means, and the other detector functions therewith so that when this detector also senses that there is no crop ahead of the cutter at its respective location the apparatus will be stopped.

In accordance with yet another feature of this invention the back sensor is displaceable relative to the harvester so as to compensate for different types of crops for harvesting on slopes. In addition this back sensor is provided with an end switch which operates a relay that cuts out the automatic steering whenever it senses that there is no crop adjacent it and maintains the harvester on its momentary course.

The back sensor according to the present invention has a control element whose resistance changes according to the position of the swath edge relative to the sensor. This variable resistance can be connected in parallel to the front crop sensor, which also has such a variable resistance, or can take the place of the front crop sensor depending on the position of the cutout means.

BRIEF DESCRIPTION OF THE DRAWING

The above and other objects, features and advantages will become more readily apparent from the following, reference being made to the accompanying drawing in which.

SPECIFIC DESCRIPTION

Figure 1:
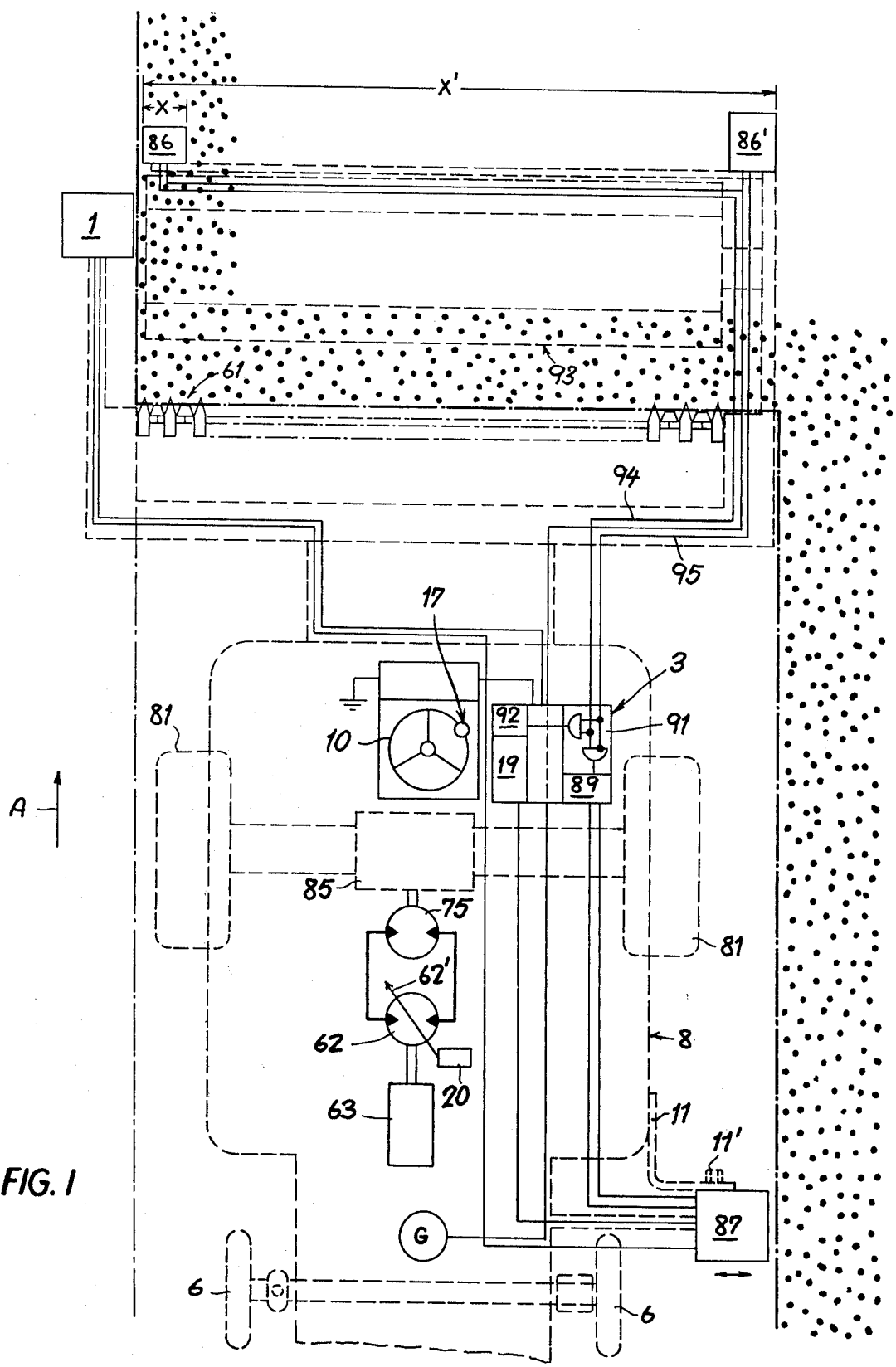
FIG. 1 is a top view partly in diagrammatic form illustrating a harvester according to the present invention.
Figure 2:
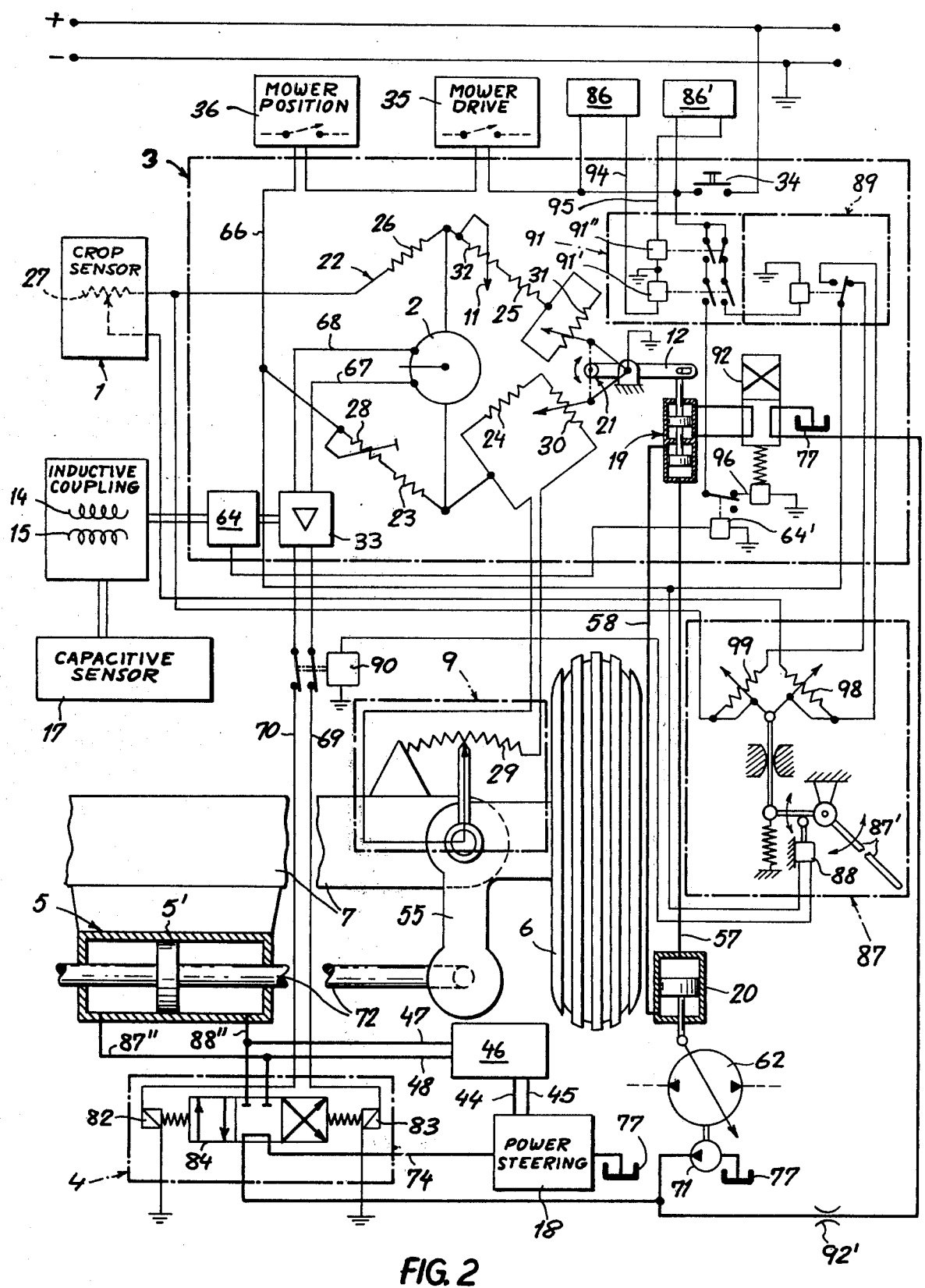
FIG. 2 is a schematic view of the automatic steering system in accordance with this invention.

As shown in FIGS. 1 and 2 a row-crop harvester has a chassis 8 provided with front wheels 81 which are driven through a transmission 85 by a large hydraulic motor 75. A diesel engine 63 on the chassis 8 is connected to a heavy-duty axial-piston hydraulic pump 62 connected to the motor 75. The swash 62' of the pump 62 can be displaced back and forth by a slave cylinder 20 so as to vary the displacement speed of the chassis 8 along the ground while the speed of engine 63 remains constant.

The slave cylinder 20 is controlled by a speed-control 19 having a speed setting lever 12 and connected via hydraulic lines 57 and 58 to this slave cylinder 20.

On the back of the chassis 8 there is provided a pair of steering wheels 6 each carried on a respective steering arm 55 connected via a respective piston rod of a double-acting hydraulic cylinder 5. This cylinder 5 is connected via respective hydraulic lines 47 and 48 to a double-acting check valve 46 whose operation is described in the above-cited patent application Ser. No. 496,743. The primary chambers of this check valve 46 are connected via hydraulic lines 47 and 48 to a valve 4 of the automatic steering system according to this invention which comprises a 3-part slide valve 84 controlled by respective solenoids 82 and 83. So long as the vehicle is on proper course or is being manually steered neither of the solenoids 82 and 83 is actuated and the pump 71 operated by the pump 62 is connected to the power-steering system 18. When the automatic steering system is operating to steer the harvester to the right the solenoid 82 pulls the valve 84 to the right and connects the pump 71 to the line 87" connected to the line 48 so as to pressurize the left-hand side of the cylinder 5. Simultaneously the right side of the cylinder 5 is connected to line 47 and valve 4 and thence to a line 74 which is connected itself at this time by a value of the power-steering system 18 to reservoir 77 of the system. Therefore the piston 5' moves to the right and the harvester is guided to the right. For a left turn the solenoid 83 is actuated and the connections to lines 87" and 88" are reversed.

The system according to the present invention comprises a crop sensor 1 having a potentiometer 27 whose resistance is proportional to the distance of the edge of the uncut crop from this sensor 1 which is in front of and to the left-hand side of the chassis 8. A steering wheel 10 is provided with the capacitive sensor 17 connected via an inductive coupling 14 and 15 to a detector 64. High-frequency oscillations generated by this detector 64 energize the coil 15 and the coil 14 inductively so that when a hand grasps the spinner knob constituting the sensor 17 on the wheel 10 the tuning characteristics change. This change is fed to an amplifier 33 which normally conducts electricity from lines 67 and 68 of a zero-voltage detector 2 to lines 69 and 70 and thence to solenoid 82 and 83. When a hand grasps the spinner knobs of sensor 17 current flow from lines 67 and 68 is interrupted.

The control system shown in FIG. 2 is energized by a generator which is connectable across a bridge circuit 22 in the control panel 3. This circuit 22 has one side with one leg formed by a fixed resistor 26 and the potentiometer 27 and another leg formed by a potentiometer 32, a fixed resistor 25, and another potentiometer 31. The other side of the bridge circuit has one leg formed by a potentiometer 28 and a fixed resistor 24 in parallel with a potentiometer 29 and both connected to the opposite ends of another potentiometer 30 in this other leg. The potentiometer 29 is carried on one of the steered wheels 6 of the harvester and has an impedance which increases as the vehicle is steered to the left and decreases as it is steered to the right. In series with the resistor 26 in the one leg of the one side of the bridge circuit is the potentiometer 27 of the crop sensor 1 and in the corresponding leg of the other side of the bridge circuit 22 there is provided the potentiometer 28 which is set according to the type of crop and how far from the edge of the mower 61 the sensor 1 is to be held. The potentiometer 32 is set according to the inclination on which the apparatus is being used. Alternatively it is within the scope of this invention to provide an automatic level sensor which automatically sets the potentiometer 32 according to ground inclination.

The potentiometers 30 and 31 have their wipers ganged and operated by a link 21 connected to the speed control 19. At a predetermined intermediate speed both the wipers of potentiometers 30 and 31 will lie in the center of their respective paths so that the resistance to both sides of these wipers in the potentiometers is equal. Both of the wipers of these potentiometers 30 and 31 are connected to one side of the input line. The other side of the input line is connected through the automatic-pilot ON-OFF switch 34, a motor drive switch 35 only closed when the mower is in operation, and a mower position switch 36 only closed when the mower is down and ready to function. Thus the bridge 22 is only energized when the mower is operating in the proper position and the switch 34 has been closed. In addition the zero-voltage detector 2 interconnecting the two sides of the bridge 22 is only connected through the amplifier 33 to the valve 4 when the operator's hand is away from the sensor 17 on the steering wheel 10.

The speed control 10 affects the potentiometers 30 and 31 so as to vary the steering response by increasing or decreasing the effect of a change in impedance in potentiometer 29 which gives the wheel-position feedback of the system. The inclination adjustment 11 in the same side of the bridge as the crop sensor 27 serves to bias the harvester directionally toward one side by unbalancing the bridge to an extend which is determined according to the inclination on which the harvester is operating.

The automatic-steering system according to the present invention also comprises the back sensor 87 which is mounted adjacent rear guide wheel 6 of the harvester 8 on a bracket 11 by means of a screw 11' allowing it to be displaced transverse to the direction A. This sensor 87 is associated with an end switch 88 that is closed when no crop is in contact with the feeler arm 87' of the sensor 88. In addition the harvester is provided in front of the guide 93 for the cutter 61 with a pair of crop sensors 86 and 86', the former being arranged inboard and in front of the sensor 1 and the latter being arranged inboard and in front of the sensor 87. Thus as the sensor 86 generates an output on its line 84 when it detects a gap in a region $x$ in front of the guide 93, and the sensor 86' on the line 95 on sensing of a gap in the region $x'$ in front of the guide 93.

The sensor 87 is arranged at a level such that it will strike any uncut standing crop so that it is able to detect the edge of the swath made by the cutter 61. The two sensors 86 and 86' may simply be comprised of microswitches operated by wands extending in front of the apparatus or may comprise sensors identical to the sensor 1 and including a threshold detector. The two outputs 94 and 95 are connected to a logic network 91 (FIG. 1). This network 91 has two electrical outputs, one of which is connected to a relay 89 and one to a stopping circuit 92. Relay 89 and the sensor 87 are connected with the sensor leg of the bridge network 22 described above. The stopping circuit 92 is constituted by an electrohydraulic 4/2 valve whose input is connected through a restriction 92' to the pump 71 and whose output is connectable to the reservoir 77. This valve 92 acts on the control cylinder 19 operated by the speed lever 12. It is also possible to use instead of this unit 92 a switchover network connected to a programming circuit. The valve 92 is operated by solenoid through a line 96 coming from the detector 64 via a relay 64' which is operated whenever a hand grasps the sensor 17 so as to disconnect the solenoid operating the valve 92 and allows free actuation of the speed lever 12.

The relay 90 has a pair of poles connected in the lines 69 and 70 between the control unit 3 and the valve 84. The end switch 88 controls the relay 90.

The apparatus functions as follows:

The harvester 8 is manually steered into the standing crop until it has advanced by a distance equal to the length of the harvester. The the operator lifts his hands from the sensor 17 so that the automatic steering takes over as it described in the above-cited application Ser. No. 496,743. As the harvester passes along through the crop it cuts a swath with the front sensor 1 automatically feeling the edge of the crop and causing the harvester to follow this edge accurately. Meanwhile the back sensor 87 is normally in contact with the guide line formed by the edge of the freshly cut swath in the crop at a spacing one mower width ($x$) off from the edge sensed by the detector 1. The sensor 86 at this time is detecting crop in small regions ahead and between the two lines detected by the sensors 1 and 87. The sensing region of the detector 86' extends across the entire swath width.

So long as crop is continuously detected by the sensors 86 and 86' neither of these units generates an output and the hydraulic 4/2 valve 92 remains in its neutral position so that manual operation of the speed-control lever 12 is possible. During this time the sensor 1 controls the steering principally with the sensor 87 providing feedback to a limited extend by means of the potentiometer 98 which is at this time coupled in series with the potentiometer 27 through the relay 89.

Should however a gap in the crop appear which would be detected by the sensor 1, the sensor 86 will generate and output over its line 94 and closes a relay 91' of the logic network 91 and thereby energizes the relay 89. This action cuts out the sensor head 1 and in its place connects the potentiometer 99 of the sensor 87 so that as long as the detector generates an output indicating a gap in the crop the harvester 8 will be guided by the sensor 87. In the case of row crops such as soy beans or corn this is extremely advantageous because the harvester then will simply be guided by a row several rows offset from the outer edge of the standing crop.

When the mower 8 however comes to the end of the field the detector 86' and the detector 86 will both generate outputs. This will cause operation of the relay 91' and a relay 91" so as to disconnect the relay 89 and to energize the valve 92 to automatically return the speed-control lever 12 to the stop position thereby rapidly bringing the harvester to a halt. Thus it is impossible for the harvester to run beyond the end of the field. This blocking is overcome by grasping the sensor 17 so as to release the valve 92 and thereby allow the speed-control lever to be operated.

It is also possible that the back sensor 87 due to a considerable change in steering will come completely out of contact with the crop. Should this happen the arm 87' of this sensor 87 will operate the limit switch 88 and open the relay 90 so as to disconnect the automatic steering from the valve 4.

Figure 3:
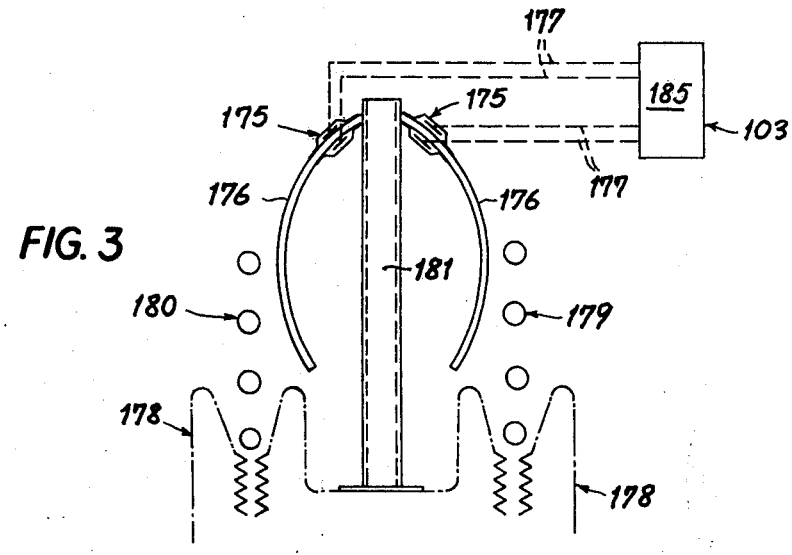
FIG. 3 is a top view of a sensor in accordance with the present invention.
Figure 4:
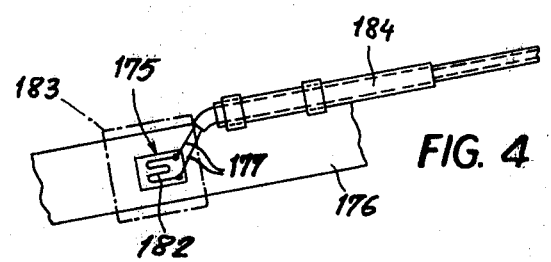
FIG. 4 is a detail view of the sensor of FIG. 3.

FIG. 3 shows a sensor comprising basically a strain gauge 175 mounted at the support end of an arcuate rod 176 and connected via leads 177 to a control circuit 185 of a control panel 103. Such a device serves as a sensor head at the front of a corn harvester 178 or the like and runs between two rows 179 and 180. The corn harvester 178 is provided with a support arm 181 extending forwardly and carrying at its front end two of the curved feeler rods 176. Two such strain gauges 175 are bonded to either side of the rod 176 at the end thereof adjacent the support post 181.

Each of these strain gauges 175 comprises a strain-gauge element 182 covered by a rigid cover plate 183 and connected via the wires 177 through a protecting tube 184 to the control system.

Figure 5:
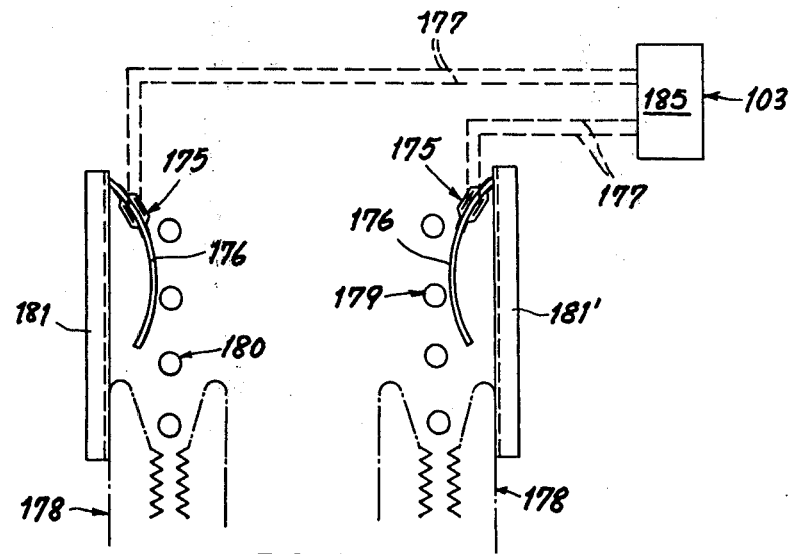
FIG. 5 is top view of yet another sensor arrangement in accordance with this invention.

In FIG. 5 the harvester 178 has a second support post 181' carrying a sensor as described above. In all cases the sensor is arranged so that as long as the harvester in on course and the two rods 176 are in line with and, indeed, out of contact with the rows 179 and 180 the strain gauges will have a predetermined resistance indicating that the harvester is on course. However as soon as either of the rods 176 is deflected the resistance of the strain gauge 175 thereon will change and the control unit 185 will therefore be able to execute a change in course so as to compensate for this offcenter position. To this end the control system 185 includes a power source for passing electricity through the strain gauges which are similar to those described on page 344 of MECHANISM PRACTICE by AHRENDT & SAVENT (McGraw Hill 1960).

The sensors according to the present invention have the considerable advantage that they have no articulated and and complicated parts. Such sensors produce an output which accurately indicates the position of the crop relative to them so that it is possible to very finely steer the harvester. In addition when rods made of fiber glass or similar material are used the device has an extremely long service life.

We claim:

1. A sensor for an automatic steering system of a standing-crop harvester having a chassis adapted to travel in a transport direction along the ground, said sensor comprising:
    a support on said chassis;
    a flexible and arcuate rod having one end secured to said support and another end extending horizontally backwardly in said direction toward said chassis; and
    a strain gauge bonded to said rod adjacent said one end.
2. The sensor defined in claim 1, further comprising another such support, rod, and strain gauge on said chassis next to the first mentioned support, rod and strain gauge.
3. The sensor defined in claim 1, further comprising a second such strain gauge on said rod opposite the first-mentioned strain gauge.
4. The sensor defined in claim 1, further comprising a cover plate on said rod overlying said gauge.

* * * * *